(12) United States Patent
Ozaki

(10) Patent No.: US 11,614,401 B2
(45) Date of Patent: Mar. 28, 2023

(54) METHOD AND APPARATUS FOR TERAHERTZ DETECTION OF CHARGED MOLECULES AND MICROBES

(71) Applicant: INSTITUT NATIONAL DE LA RECHERCHE SCIENTIFIQUE, Quebec (CA)

(72) Inventor: Tsuneyuki Ozaki, Brossard (CA)

(73) Assignee: INSTITUT NATIONAL DE LA RECHERCHE SCIENTIFIQUE, Quebec (CA)

( * ) Notice: Subject to any disclaimer, the term of this patent is extended or adjusted under 35 U.S.C. 154(b) by 378 days.

(21) Appl. No.: 16/910,066

(22) Filed: Jun. 24, 2020

(65) Prior Publication Data

US 2020/0400560 A1 Dec. 24, 2020

Related U.S. Application Data

(60) Provisional application No. 62/863,920, filed on Jun. 20, 2019.

(51) Int. Cl.
*G01N 21/3581* (2014.01)

(52) U.S. Cl.
CPC .......... *G01N 21/3581* (2013.01); *G01N 2201/06113* (2013.01)

(58) Field of Classification Search
CPC ............ G01N 21/3581; G01N 2201/06113
See application file for complete search history.

(56) References Cited

U.S. PATENT DOCUMENTS 8,710,440 B2 * 4/2014 Kiwa .................. G01T 1/24
250/341.1

OTHER PUBLICATIONS

Kiwa et al. ("Imaging of Chemical Reactions Using a Terahertz Chemical Microscope," Photonics 2019, 6, pp. 1-10 published Jan. 27, 2019) (Year: 2019).*
Tonouchi, M., et al., Cutting-edge terahertz technology. Nature Photon 1, 97-105 (2007); https://doi.org/10.1038/nphoton.2007.3.
Bjarnason, J. E., et al., Millimeter-wave, terahertz, and mid-infrared transmissionthrough common clothing, Appl. Phys. Lett. 85, 519 (2004); https://doi.org/10.1063/1.1771814.
Mittleman, D., et al. Recent advances in terahertz imaging . Appl Phys B 68, 1085-1094 (1999); https://doi.org/10.1007/s003400050750.

(Continued)

*Primary Examiner* — David P Porta
*Assistant Examiner* — Meenakshi S Sahu
(74) *Attorney, Agent, or Firm* — Gwendoline Bruneau; Lavery, De Billy, LLP

(57) ABSTRACT

A system for Terahertz detection of target charged cells, comprising a near-infrared femtosecond radiation source; a sensing plate, the sensing plate comprising a sensing film deposited on an insulator/semiconductor film; wherein the radiation source is configured to irradiate the sensing plate, and upon irradiation, the sensing plate emits electromagnetic pulses in a THz frequency range in a specular direction of reflection. The method for Terahertz detection of target charged cells comprises irradiating a sensing plate comprising a sensing film deposited on an insulator/semiconductor film with a near-infrared femtosecond radiation; applying a charged bias voltage to the sensing film; and monitoring variations in amplitude of THz pulses emitted by the sensing plate.

19 Claims, 2 Drawing Sheets

(56) References Cited

OTHER PUBLICATIONS

Mittleman, D. M., et al., "T-ray imaging," in IEEE Journal of Selected Topics in Quantum Electronics, vol. 2, No. 3, pp. 679-692, Sep. 1996; https://doi.org/10.1109/2944.571768.

Møller, U., et al., "Terahertz reflection spectroscopy of Debye relaxation in polar liquids," J. Opt. Soc. Am. B 26, A113-A125 (2009); https://doi.org/10.1364/JOSAB.26.00A113.

Kiwa, T., et al., "Work function shifts of catalytic metals under hydrogen gas visualized by terahertz chemical microscopy," Opt. Express 20, 11637-11642 (2012); https://doi.org/10.1364/OE.20.011637.

Kiwa, T., et al., "Chemical sensing plate with a laser-terahertz monitoring system," Appl. Opt. 47, 3324-3327 (2008); https://doi.org/10.1364/AO.47.003324.

Kiwa, T., et al., Terahertz chemical microscope for label-free detection of protein complex, Appl. Phys. Lett. 96, 211114 (2010); https://doi.org/10.1063/1.3441408.

Hassan, E. M., et al., High-sensitivity detection of metastatic breast cancer cells via terahertz chemical microscopy using aptamers, Sensors & Actuators: B. Chemical , 287, 595-601 (2019); https://doi.org/10.1016/j.snb.2019.02.019.

\* cited by examiner

METHOD AND APPARATUS FOR TERAHERTZ DETECTION OF CHARGED MOLECULES AND MICROBES

CROSS REFERENCE TO RELATED APPLICATIONS

This application claims benefit of U.S. provisional application Ser. No. 62/863,920, filed on Jun. 25, 2019. All documents above are incorporated herein in their entirety by reference.

FIELD OF THE INVENTION

The present invention relates to detection of charged molecules and microbes. More specifically, the present invention is concerned with a method and an apparatus for Terahertz detection of charged molecules and microbes.

BACKGROUND OF THE INVENTION

Advanced optical techniques developed over the past 20 years have overcome difficulties in generating and detecting THz waves, and many companies have commercialized instruments for THz spectroscopy and imaging. A range of applications is possible using THz pulses, many of which rely on the ability of THz radiation to pass through non-conducting and non-polar materials such as clothing [2], certain foods [3] and common packaging materials [4]. This includes in-line, non-destructive testing, quality assurance and security imaging, in mail and body scanners for instance. The THz region is also rich with vibrational signatures, enabling chemical sensing of illicit materials such as explosives [19] or narcotics [20] for instance.

The terahertz (THz) portion of the electromagnetic spectrum, lying above the frequencies of electronics and below the frequencies of photonics, thus in a range between about at least 0.1 THz and about 30 THz, represents a frontier of commercial applications of light [1]. Despite a high potential for imaging and spectroscopy, there are several characteristics of THz radiation that have held back its widespread applications to certain sectors. First, THz radiation is highly absorptive to polar liquids, such as water. Although techniques such as attenuated total reflectance (ATR) spectroscopy could be used for highly absorptive media [5], the treatment and interpretation of data remain a challenge. Secondly, the situation is further made difficult by the complicated nature of absorption spectra in the THz regime, which consists of multiple vibrational and rotational lines. Therefore, while conventional THz spectroscopy is a powerful tool to characterize materials with well-known composition, it rapidly loses its effectiveness in case of complex mixtures, which frequently occurs in the real world.

To overcome the challenges of implementing THz technology practical applications, a tool for using THz radiation to monitor chemical reactions, known as the THz chemical microscope (TCM) has been presented [6-9].

The THz chemical microscope has several advantages over conventional THz spectroscopy and imaging techniques. First, THz radiation does not directly interact with the material to be probed and thus could be used on samples that are highly absorptive or scattering in the THz range, such as aqueous samples for example. Secondly, chemical selectivity is provided by a sensing film, and concentration of chemicals could be read as directly obtained from the THz intensity, thus eliminating the need to decipher information from the THz spectrum. These features come with the ability of THz technology to perform non-contact and non-destructive measurements. Thus, sensing plates including a number of small patches of different sensing films that have selectivity to different chemicals, could be used for simultaneous rapid monitoring of numerous substances in real-time using the TCM.

Still, a major challenge for the THz chemical microscope is to improve its detection sensitivity and specificity to targets such as molecules, microbes, cells and bacteria for instance. In a THz chemical microscope, the target molecules and cells must bind to the sensing film in order to be detected. In present chemical microscopes, the main mechanism by which the targets come in proximity to the sensing film is by diffusion. For liquid samples, mixing or stirring may increase the chance of binding, but may also result in unwanted molecules and cells attaching to the sensing film, which may lead to false positive THz signals and thus detection errors. In theory, the THz chemical microscope detection sensitivity and specificity could be improved by selecting sensing films that have high binding efficiency or selectivity to the specific target. However, in many cases the range of materials for the sensing film is limited, and methods to modify the sensing film to improve binding efficiency and/or selectivity are still complicated and not well understood.

In summary, in the conventional THz chemical microscope, the method to increase its sensitivity and selectivity still comprises improving the affinity of the sensing film to the target, which remains a challenge. For example, aptamers, which have thus been immobilized on sensing films to detect breast cancer cells [10], take a long time, for example from several months to more than a year, to develop and optimize against a specific target, and their development may sometimes fail. Although aptamers and other molecules or membranes have been developed, their affinity to the target is fixed, and there exists no method to improve the performance of the TCM that uses such existing aptamers, molecules and membranes.

There is still a need for a method and an apparatus for Terahertz detection of charged molecules and microbes.

SUMMARY OF THE INVENTION

More specifically, in accordance with the present invention, there is provided a system for Terahertz detection of target charged cells, comprising a near-infrared femtosecond radiation source; a sensing plate, the sensing plate comprising a sensing film deposited on an insulator/semiconductor film; wherein the radiation source is configured to irradiate the sensing plate, and upon irradiation, the sensing plate emits electromagnetic pulses in a THz frequency range in a specular direction of reflection.

There is further provided a method for Terahertz detection of target charged cells, comprising irradiating a sensing plate comprising a sensing film deposited on an insulator/semiconductor film with a near-infrared femtosecond radiation; applying a charged bias voltage to the sensing film; and monitoring variations in amplitude of THz pulses emitted by the sensing plate.

There is further provided a method for binding affinity, comprising irradiating a sensing plate comprising a sensing film deposited on an insulator/semiconductor film with a near-infrared femtosecond radiation; applying a bias voltage on a surface of the sensing film; and monitoring variations in amplitude of THz pulses emitted by the sensing plate.

Other objects, advantages and features of the present invention will become more apparent upon reading of the

DESCRIPTION OF ILLUSTRATIVE EMBODIMENTS

The present invention is illustrated in further details by the following non-limiting examples.

Figure 1:
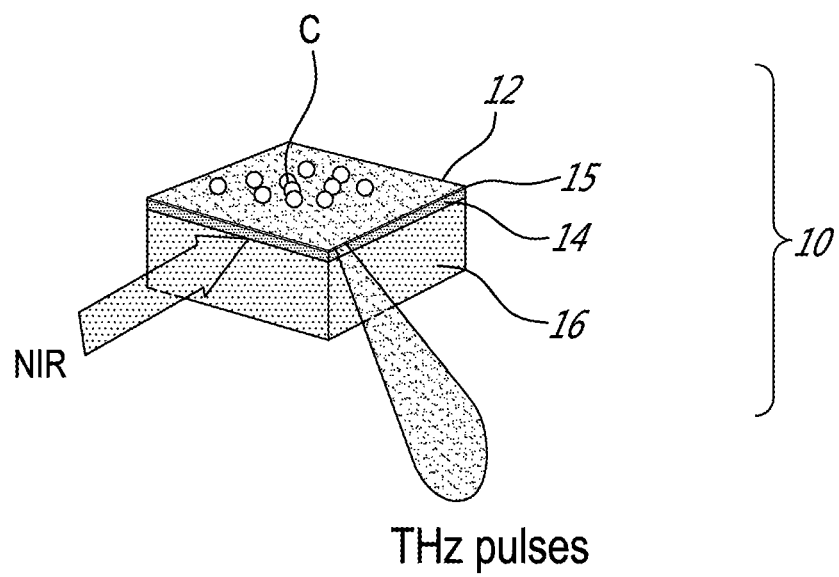
FIG. 1 is a schematic of a THz chemical microscope.

FIG. 1 shows an apparatus comprising a sensing plate 10 on a laser-grade sapphire substrate 16. The sensing plate 10 comprises a sensing film 12 deposited on a $SiO_2/Si$ film 14. A depletion layer 15 forms near the $SiO_2/Si$ film 14 boundary due to defects, giving rise to local electric field gradients. When a near-infrared (NIR) femtosecond laser irradiates the sensing plate 10 from the side of the substrate 16, carriers are generated in the $SiO_2/Si$ film 14, which are then accelerated by these field gradients. The accelerated carriers in turn generates electromagnetic pulses. The generated electromagnetic pulses, typically in the THz frequency range, are emitted in the specular direction of reflection of the apparatus.

When chemicals attach to the sensing film 12, the electric field gradient within the depletion layer is modified, thus giving rise to changes in the intensity of the emitted electromagnetic pulses. Therefore, changes in the chemical and electric potentials at the surface of the sensing film 12 are measured as changes in the amplitude of the emitted THz pulse. Thus, detection of the variation of amplitude of the emitted THz pulses allows measuring the variation of the number of cells on the surface of the sensing plate 10.

The substrate 16 is selected for transparency to both the NIR laser and the THz pulse. The photon energy of the NIR laser is selected to be higher than the bandgap of Si used in the $SiO_2/Si$ film 14.

The $SiO_2/Si$ film 14 may be substituted with other combinations of insulator/semiconductor materials, such as $SiO_2/InP$ for example, provided the bandgap of the semiconductor is smaller than the photon energy of the femtosecond laser used to excite the film 14.

The sensing film 12 is selected with high selectivity to a chemical (C) to be detected. For example, aptamers, which bind selectively to a specific target molecule, could be used for the sensing film 12.

Figure 2:
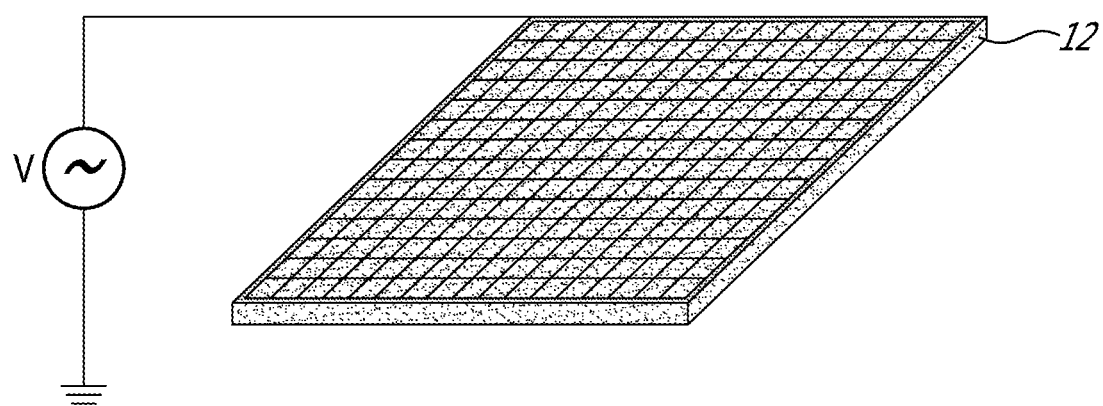
FIG. 2 is a schematical view of an apparatus according to an embodiment of an aspect of the present disclosure.

As schematically illustrated in FIG. 2, a method according to an embodiment of an aspect of the present disclosure comprises applying a bias voltage (V) on the surface of the sensing film 12, so that the target chemical (C) to be detected is attracted to, or repelled from, the sensing plate 10, depending on the polarity of the bias voltage (V) and the charge of the target chemical (C).

The bias voltage (V) may be applied to the sensing film 12 using, for example, a mesh-like electrode fabricated on the surface of the sensing film 12.

Figure 3:
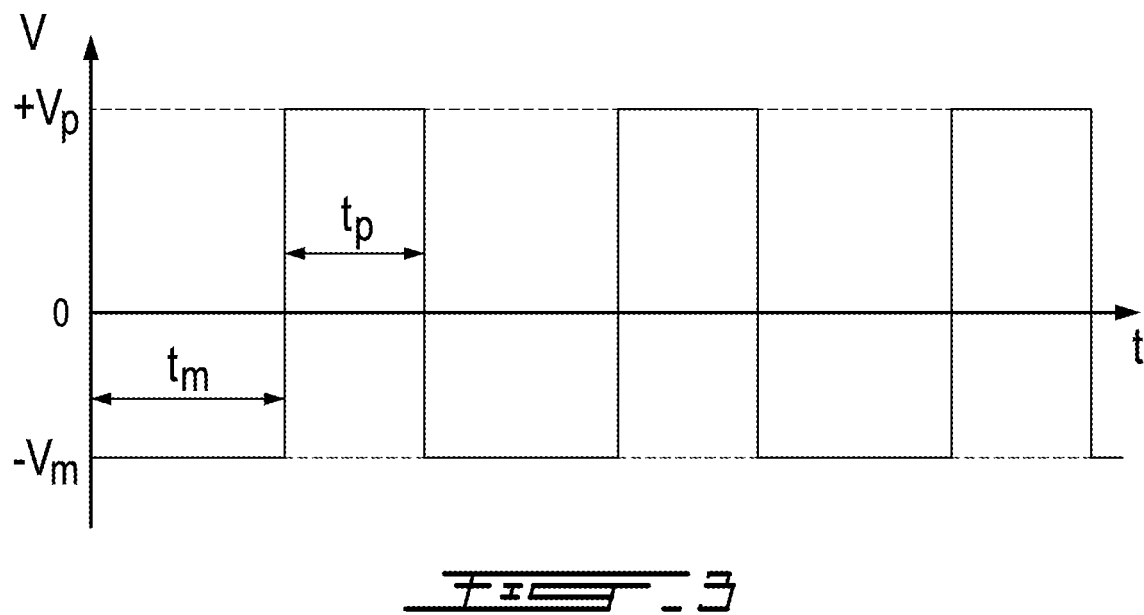
FIG. 3 shows a bias voltage (V) oscillating in time between positive $(+V_p)$ and negative $(-V_m)$ polarity in a method according to an embodiment of an aspect of the present disclosure.

The bias voltage (V) is selected as a voltage oscillating in time between positive $(+V_p)$ and negative $(-V_m)$ polarity, such as that shown in FIG. 3. If the target chemical (C) is negatively charged, then it is attracted to the sensing film 12 when the bias voltage (V) is positive, and repelled from the sensing film 12 when the bias voltage (V) is negative. The surface of cells and bacteria, including a number of molecules, such as molecules of interest in biology and medicine applications, such as DNA and RNA for example, is naturally negatively charged.

If the target chemical (C) is positively charged, then it is attracted to the sensing film when the bias voltage (V) is negative, and repelled from the sensing film 12 when the bias voltage (V) is positive.

Attraction results in a higher concentration of the target chemical (C) in the vicinity of the sensing film, thereby increasing the probability of the target chemical (C) to bind with the sensing film, thus increasing the sensitivity of detection of the target chemical (C). Repulsion repels the charged non-targets, such as, for example, healthy cells when trying to detect target cancerous cells, away from the sensing film, 12 while the target chemical (C) remains bound, thus increasing the selectivity of detection thereof.

Thus, a repulsion phase occurs when the bias voltage (V) is negative in case of negatively charged targets and when the bias voltage (V) is positive in case of positively charged targets. The method comprises selecting the amplitude and temporal duration $(t_m, t_p)$ of the bias voltage (V) during the repulsion phase so as to maintain the target chemicals (C) attracted to sensing film during successive attraction onto the sensing film 12. By controlling the amplitude and temporal duration $(t_m, t_p)$ of the positive and negative bias voltage (V), the number of targets that bind to the sensing film 12 is enhanced, thus increasing the sensitivity of detection of the target chemical (C), while controlling and minimizing the concentration of non-targets in the vicinity of the sensing film 12, thereby improving the selectivity of the detection of the target chemical (C).

The absolute values ($|V_p|$, $|V_m|$) and the temporal durations $t_p$ and $t_m$ of the positive and negative bias voltage may be different from one another or the same. The absolute values $|V_p|$ and $|V_m|$ and the temporal durations $t_p$ and $t_m$ of the positive and negative bias voltage may be selected and adjusted so as to maximize the sensitivity and selectivity of detection. For example, in FIG. 3, the temporal duration $t_m$ of the negative bias voltage is selected to be longer than the temporal duration $t_p$ of the positive bias voltage in order to allow unwanted negatively charged cells to be repelled far away from the sensing plate for increased selectivity. Moreover, $|V_p|$ is selected to be higher than $|V_m|$ so that target cells that have higher negative charges are attracted to the sensing plate faster than the unwanted cells. Note that when the THz signal from the apparatus is being measured, this bias voltage is grounded.

The present method and apparatus thus allow improving the sensitivity and selectivity of a THz chemical microscope by controlling the parameters, such as amplitude and duration, of the bias voltage.

Moreover, the sensitivity and specificity of the THz chemical microscope to targets, such as molecules, microbes, cells and bacteria for example, which are electrically charged, is increased.

Figure 4A:
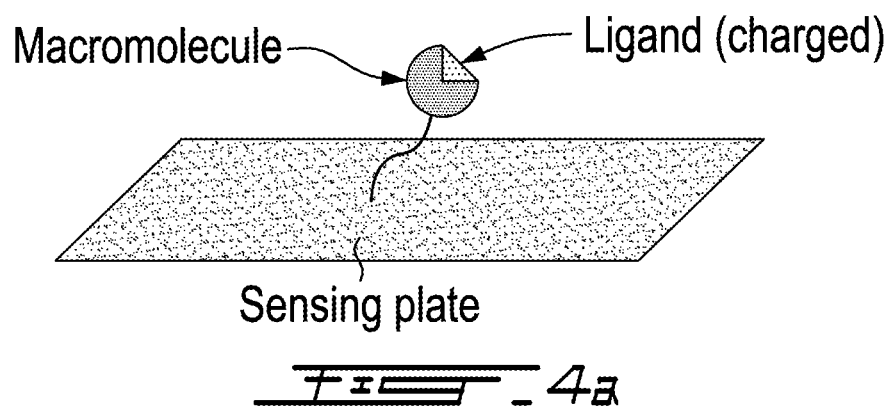
FIG. 4A show a schematical view of a step in method according to an embodiment of an aspect of the present disclosure.
Figure 4B:
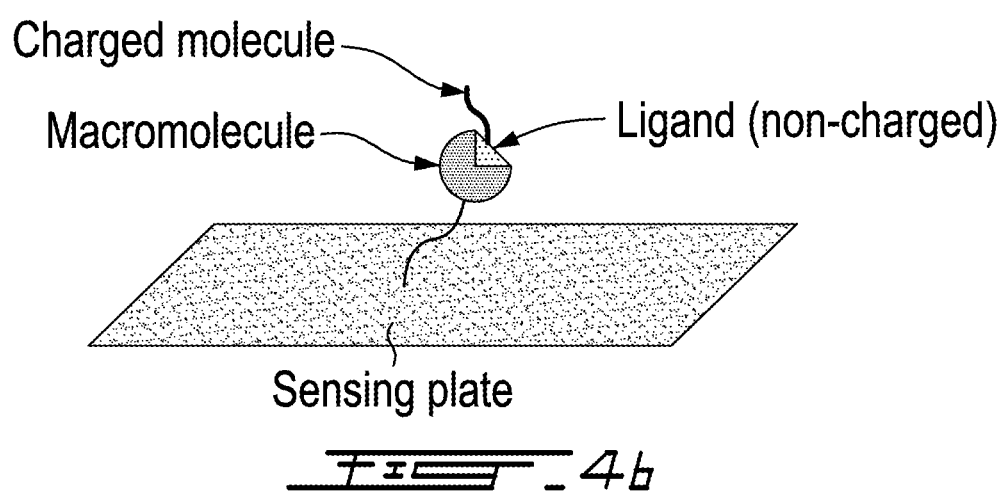
FIG. 4B show a schematical view of a step in method according to an embodiment of an aspect of the present disclosure.

As schematized in FIG. 4, a method according to an embodiment of an aspect of the present disclosure comprises measuring the binding affinity between molecules. The method comprises immobilizing a macromolecule-ligand complex onto the sensing film 12 of the apparatus, with the charged macromolecule or ligand not directly binding to the sensing film 12 (see FIG. 4A). If neither macromolecule nor ligand are charged, a charged molecule, such as an aptamer for example, is bound to the molecule that is not directly bound to the sensing film 12 (see FIG. 4B). Then, a bias voltage (V) is applied to the sensing film 12 as described hereinabove in relation to FIG. 3 for example, and the dissociation of the complex is monitored by monitoring the THz signal of the apparatus as a function of the magnitude of the bias voltage (V).

In comparison with Isothermal Titration Calorimetry (ITC) for example, the present method provides quick measurement, within minutes, for example in 10 minutes, allowing high-throughput screening, as well as straightforward interpretation of data. High-throughput measurement of binding affinity is of interest in the pharmaceutics industry for example.

A device incorporating a THz chemical microscope as presented hereinabove may be used to improve and accelerate the development of high-quality sensing agents for the THz chemical microscope, such as aptamers.

The present method and apparatus may also be of interest in applications that require the measurement of binding affinity, such as in the pharmaceutics, or in the manufacturing field of measurement equipment.

The scope of the claims should not be limited by the embodiments set forth in the examples, but should be given the broadest interpretation consistent with the description as a whole.

REFERENCES

[1] M. Tonouchi, Nat Photonics 1, 97 (2007).
[2] J. E. Bjarnason, T. L. J. Chan, A. W. M. Lee, M. A. Celis, and E. R. Brown, Appl Phys Lett 85, 519 (2004).
[3] D. Mittleman, M. Gupta, R. Neelamani, R. Baraniuk, J. Rudd, and M. Koch, Appl Phys B 68, 1085 (1999).
[4] D. Mittleman, R. Jacobsen, and M. Nuss, IEEE J Sel Top Quant 2, 679 (1996).
[5] U. Moller, D. G. Cooke, K. Tanaka, and P. U. Jepsen, J Opt Soc Am B 26, A113 (2009).
[6] T. Kiwa, T. Hagiwara, M. Shinomiya, K. Sakai, and K. Tsukada, Opt Express 20, 11637 (2012).
[7] T. Kiwa, J. Kondo, S. Oka, I. Kawayama, H. Yamada, M. Tonouchi, and K. Tsukada, Appl Optics 47, 3324 (2008).
[8] T. Kiwa, Y. Kondo, Y. Minami, I. Kawayama, M. Tonouchi, and K. Tsukada, Appl Phys Lett 96, 211114 (2010).
[9] T. Kiwa and K. Tsukada, U.S. Pat. No. 8,710,440B2 (29 Apr. 2014).
[10] E. M. Hassan, A. Mohamed, M. C. DeRosa, W. G. Willmore, Y. Hanaoka, T. Kiwa, and T. Ozaki, accepted for publication in Sensors & Actuators: B. Chemical (2019).

The invention claimed is:

1. A system for Terahertz detection of target charged cells, comprising:
a near-infrared femtosecond radiation source;
a sensing plate, said sensing plate comprising a sensing film deposited on an insulator/semiconductor film;
a bias voltage generator, the bias voltage generator, said being configured to applying a charged bias voltage to the sensing film oscillating in time between positive and negative polarity, thereby: i) if the target charged cells are negatively charged, attracting target charged cells to the sensing film when the bias voltage is positive, and repelling the target charged cells from the sensing film when the bias voltage is negative; and ii) if the target charged cells are positively charged, attracting the target charged cells to the sensing film when the bias voltage is negative, and repelling the target charged cells from the sensing film when the bias voltage is positive; and
a detector;
wherein said radiation source is configured to irradiate said sensing plate, and upon irradiation, said sensing plate emits electromagnetic pulses in a THz frequency range in a specular direction of reflection, said detector detecting a variation of amplitude of emitted THz pulses, and the variation of the amplitude of the emitted THz pulses being used to measure a variation of a number of cells on the surface of the sensing plate.

2. The system of claim 1, wherein said sensing plate is deposited on a substrate.

3. The system of claim 1, wherein said sensing plate is deposited on a substrate, said substrate being selected for transparency to both the near-infrared femtosecond radiation and the emitted electromagnetic pulses in the THz frequency range.

4. The system of claim 1, wherein the photon energy of the near-infrared femtosecond radiation is selected to be higher than the bandgap of a semiconductor of the insulator/semiconductor film.

5. The system of claim 1, wherein said insulator/semiconductor is a $SiO_2$/Si film.

6. The system of claim 1, wherein said insulator/semiconductor is a $SiO_2$/InP.

7. The system of claim 1, wherein said sensing film is an aptamer.

8. The system of claim 1, wherein the target charged cells are non-charged target cells bound to charged cells.

9. A method for Terahertz detection of target charged cells, comprising:
irradiating a sensing plate comprising a sensing film deposited on an insulator/semiconductor film with a near-infrared femtosecond radiation;
applying a charged bias voltage to the sensing film; and
monitoring variations in amplitude of THz pulses emitted by the sensing plate, the method comprising selecting a bias voltage oscillating in time between positive and negative polarity, thereby: i) if the target charged cells are negatively charged, attracting the target charged cells to the sensing film when the bias voltage is positive, and repelling the target charged cells from the sensing film when the bias voltage is negative; and ii) if the target charged cells are positively charged, attracting the target charged cells to the sensing film when the bias voltage is negative, and repelling the target charged cells from the sensing film when the bias voltage is positive.

10. The method of claim 9, comprising determining a variation in a number of the target charged cells on the sensing plate from the variations in amplitude of the emitted THz pulses.

11. A method for Terahertz detection of target charged cells, comprising:
irradiating a sensing plate comprising a sensing film deposited on an insulator/semiconductor film with a near-infrared femtosecond radiation;

applying a charged bias voltage to the sensing film; and
monitoring variations in amplitude of THz pulses emitted by the sensing plate, the method comprising selecting at least one of: i) the amplitude and ii) the temporal duration of at least one of: i) the positive bias voltage and ii) the negative bias voltage, so as to maintain the target cells attracted to the sensing film during successive attraction phases onto the sensing film.

12. A method for Terahertz detection of target charged cells, comprising:
irradiating a sensing plate comprising a sensing film deposited on an insulator/semiconductor film with a near-infrared femtosecond radiation;
applying a charged bias voltage to the sensing film; and
monitoring variations in amplitude of THz pulses emitted by the sensing plate, the method comprising selecting at least one of: i) the amplitude and ii) the temporal duration of the charged bias voltage opposed to the charge of the target charge cells.

13. The method of claim 9, comprising grounding the bias voltage and measuring the THz pulses emitted by the sensing plate.

14. A method for Terahertz detection of target charged cells, comprising:
irradiating a sensing plate comprising a sensing film deposited on an insulator/semiconductor film with a near-infrared femtosecond radiation;
applying a charged bias voltage to the sensing film; and
monitoring variations in amplitude of THz pulses emitted by the sensing plate, the method, comprising selecting at least one of: i) the amplitude and ii) temporal duration of at least one of: i) the positive bias voltage and ii) the negative bias voltage so as to increase repulsion of non-target charged cells from the sensing plate.

15. The method of claim 9, comprising applying the bias voltage using an electrode provided on the surface of the sensing film.

16. The method of claim 9, wherein the target charged cells comprise DNA or RNA.

17. The method of claim 9, wherein the target charged cells comprise cancerous cells.

18. The method of claim 9, wherein the target charged cells comprise non-charged target cells bound to charged cells.

19. A method for measuring binding affinity between molecules, comprising:
immobilizing molecules onto a sensing film;
irradiating a sensing plate comprising the sensing film deposited on an insulator/semiconductor film with a near-infrared femtosecond radiation; and
applying a bias voltage on a surface of the sensing film
the method comprising selecting a bias voltage oscillating in time between positive and negative polarity, and monitoring a dissociation of the molecules by monitoring variations in amplitude of THz pulses emitted by the sensing plate as a function of the magnitude of the bias voltage.

* * * * *